US009077855B2

(12) United States Patent
Riley et al.

(10) Patent No.: US 9,077,855 B2
(45) Date of Patent: Jul. 7, 2015

(54) METHOD AND SYSTEM FOR DISTRIBUTING CONTENT TO A USER DEVICE THROUGH ALLOCATED ASSETS OF A SATELLITE NETWORK AND A BROADBAND NETWORK

(75) Inventors: Xavier D. Riley, Los Angeles, CA (US); Ranny Q. Sue, Laguna Niguel, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2005 days.

(21) Appl. No.: 11/782,565

(22) Filed: Jul. 24, 2007

(65) Prior Publication Data
US 2009/0031354 A1 Jan. 29, 2009

(51) Int. Cl.
| | |
|---|---|
| H04N 7/20 | (2006.01) |
| H04N 7/18 | (2006.01) |
| H04N 7/16 | (2011.01) |
| H04N 21/2385 | (2011.01) |
| H04N 21/24 | (2011.01) |
| H04N 21/258 | (2011.01) |
| H04N 21/61 | (2011.01) |

(52) U.S. Cl.
CPC ............ *H04N 7/165* (2013.01); *H04N 21/2385* (2013.01); *H04N 21/2407* (2013.01); *H04N 21/25891* (2013.01); *H04N 21/6143* (2013.01)

(58) Field of Classification Search
USPC .................. 725/63–66, 86–104, 118, 148
See application file for complete search history.

(56) References Cited

U.S. PATENT DOCUMENTS

| | | | |
|---|---|---|---|
| 5,852,721 A | * | 12/1998 | Dillon et al. .................. 709/217 |
| 6,557,171 B1 | | 4/2003 | Sonoda et al. |
| 6,772,209 B1 | | 8/2004 | Chernock et al. |
| 6,774,926 B1 | | 8/2004 | Ellis et al. |
| 7,165,050 B2 | | 1/2007 | Marking |

(Continued)

FOREIGN PATENT DOCUMENTS

| | | |
|---|---|---|
| EP | 1202507 A | 5/2002 |
| WO | 0169868 A | 9/2001 |

OTHER PUBLICATIONS

International Search Report and Written Opinion dated Feb. 12, 2009 in International Application No. PCT/US2008/070909 filed Jul. 23, 2008 by Xavier D. Riley et al.

(Continued)

*Primary Examiner* — Hunter B Lonsberry
*Assistant Examiner* — Michael Telan

(57) ABSTRACT

A communication system 100 includes a content repository 274 storing a plurality of content files associated with the content distribution system. A transport processing system 250 communicating with the content distribution system, a terrestrial communication network 132, and a content delivery network 280 communicating with the content distribution system 260 and the terrestrial network. The content management system assigns a satellite category or a broadband category to each of the plurality of content files in response to a popularity rating. The content distribution system 274 communicates the content to the transport processing system. The transport processing system 250 communicates the content through a satellite from the transport processing system to a user device. The content distribution system 260, in response to the broadband category, communicates the content to the content delivery network 280. The content delivery network 280 communicates the content through a terrestrial communication network to the user device.

24 Claims, 7 Drawing Sheets

(56) References Cited

U.S. PATENT DOCUMENTS

| | | | |
|---|---|---|---|
| 7,277,870 | B2 | 10/2007 | Mourad et al. |
| 7,778,875 | B2 | 8/2010 | Schauser et al. |
| 2001/0004769 | A1 | 6/2001 | Simon |
| 2002/0007491 | A1* | 1/2002 | Schiller et al. .................. 725/87 |
| 2002/0052969 | A1* | 5/2002 | Fujiwara ....................... 709/231 |
| 2002/0059621 | A1 | 5/2002 | Thomas et al. |
| 2002/0174439 | A1 | 11/2002 | Akiyama et al. |
| 2002/0184642 | A1 | 12/2002 | Lude et al. |
| 2003/0009765 | A1* | 1/2003 | Linden et al. .................. 725/95 |
| 2003/0093806 | A1* | 5/2003 | Dureau et al. ................ 725/107 |
| 2003/0121047 | A1 | 6/2003 | Watson et al. |
| 2004/0117839 | A1 | 6/2004 | Watson et al. |
| 2004/0133907 | A1* | 7/2004 | Rodriguez et al. .............. 725/14 |
| 2005/0216952 | A1 | 9/2005 | Johnson |
| 2006/0037037 | A1* | 2/2006 | Miranz ............................. 725/2 |
| 2006/0143654 | A1 | 6/2006 | Mochiduki |
| 2007/0011709 | A1 | 1/2007 | Katz et al. |
| 2007/0113246 | A1* | 5/2007 | Xiong ............................. 725/39 |
| 2007/0150922 | A1 | 6/2007 | Seo et al. |
| 2007/0192805 | A1 | 8/2007 | Dutta et al. |
| 2007/0283449 | A1 | 12/2007 | Blum et al. |
| 2008/0022347 | A1 | 1/2008 | Cohen |
| 2008/0155613 | A1 | 6/2008 | Benya et al. |

OTHER PUBLICATIONS

Non-final Office action dated Nov. 18, 2009 in U.S. Appl. No. 11/828,520, filed Jul. 26, 2007 by Xavier D. Riley et al.

Non-final Office action dated Jan. 21, 2010 in U.S. Appl. No. 11/782,579, filed Jul. 24, 2007 by Xavier D. Riley et al.

Final Rejection dated May 4, 2010 in U.S. Appl. No. 11/828,520, filed Jul. 26, 2007 by Xavier D. Riley et al.

Final Rejection dated Jan. 5, 2011 in U.S. Appl. No. 11/782,554, filed Jul. 24, 2007 by Ranny Q. Sue et al.

Non-final Office action dated Jul. 21, 2010 in U.S. Appl. No. 11/782,554, filed Jul. 24, 2007 by Ranny Q. Sue et al.

Final Rejection dated Jul. 12, 2010 in U.S. Appl. No. 11/782,579, filed Jul. 24, 2007 by Xavier D. Riley et al.

Non-final Office action dated Feb. 16, 2011 in U.S. Appl. No. 11/828,520, filed Jul. 26, 2007 by Xavier D. Riley et al.

Notice of Allowance dated Jun. 26, 2013 in U.S. Appl. No. 11/828,520, filed Jul. 26, 2007 by Xavier D. Riley et al.

Final Rejection dated Aug. 5, 2011 in U.S. Appl. No. 11/828,520, filed Jul. 26, 2007 by Xavier D. Riley et al.

Chinese Office action dated Nov. 23, 2012 in Chinese Patent Application No. 200880106028.6 filed Jul. 23, 2008 by Xavier D. Riley et al.

Final Rejection dated Dec. 17, 2012 in U.S. Appl. No. 11/828,520, filed Jul. 26, 2007 by Xavier D. Riley et al.

Non-final Office action dated Apr. 24, 2012 in U.S. Appl. No. 11/828,520, filed Jul. 26, 2007 by Xavier D. Riley et al.

Non-final Office action dated Mar. 23, 2015 in U.S. Appl. No. 11/782,579 filed Jul. 24, 2007 by Xavier D. Riley et al.

* cited by examiner

METHOD AND SYSTEM FOR DISTRIBUTING CONTENT TO A USER DEVICE THROUGH ALLOCATED ASSETS OF A SATELLITE NETWORK AND A BROADBAND NETWORK

TECHNICAL FIELD

The present disclosure relates to a content processing and delivery system and, more specifically, to a method and system for distributing content through either a satellite network or a broadband network and allocating the assets of the satellite network.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

SUMMARY

The present disclosure utilizes either a broadcast transport processing system or a content delivery network coupled to a broadband communication network for delivering content to user devices.

In one aspect of the disclosure, a method includes storing a plurality of content files in a content repository associated with a content distribution system, determining a popularity rating of the plurality of content files, determining a satellite asset allocation in response to the popularity rating, and communicating the content to a user device through a satellite in response to the asset allocation.

In another aspect of the disclosure, a method includes storing a plurality of content files in a content repository associated with a content distribution system, determining a popularity rating of the plurality of content files, assigning a satellite category or a broadband category to each of the plurality of content files in response to the popularity rating, in response to the satellite category, communicating the content to a transport processing system, communicating the content to a satellite from the transport processing system, communicating the content to a user device through the satellite, and in response to the broadband category, communicating the content to a content delivery network, communicating the content to a terrestrial communication network from the content delivery network and communicating content to the user device through the terrestrial communication network.

In a further aspect of the disclosure, a communication system includes a content repository storing a plurality of content files associated with a content distribution system, a transport processing system communicating with the content distribution system, a terrestrial communication network and a content delivery network communicating with the content distribution system and the terrestrial network and determining a popularity rating of the content. The communication system also includes a content management system receiving the popularity rating and assigning a satellite category or a broadband category to each of the plurality of content files in response to the popularity rating. The content distribution system communicates the content to the transport processing system in response to the satellite category. The transport processing system communicates the content through a satellite from the transport processing system to a user device. The content distribution system in response to the broadband category communicates the content to the content delivery network. The content delivery network communicates the content through a terrestrial communication network to the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
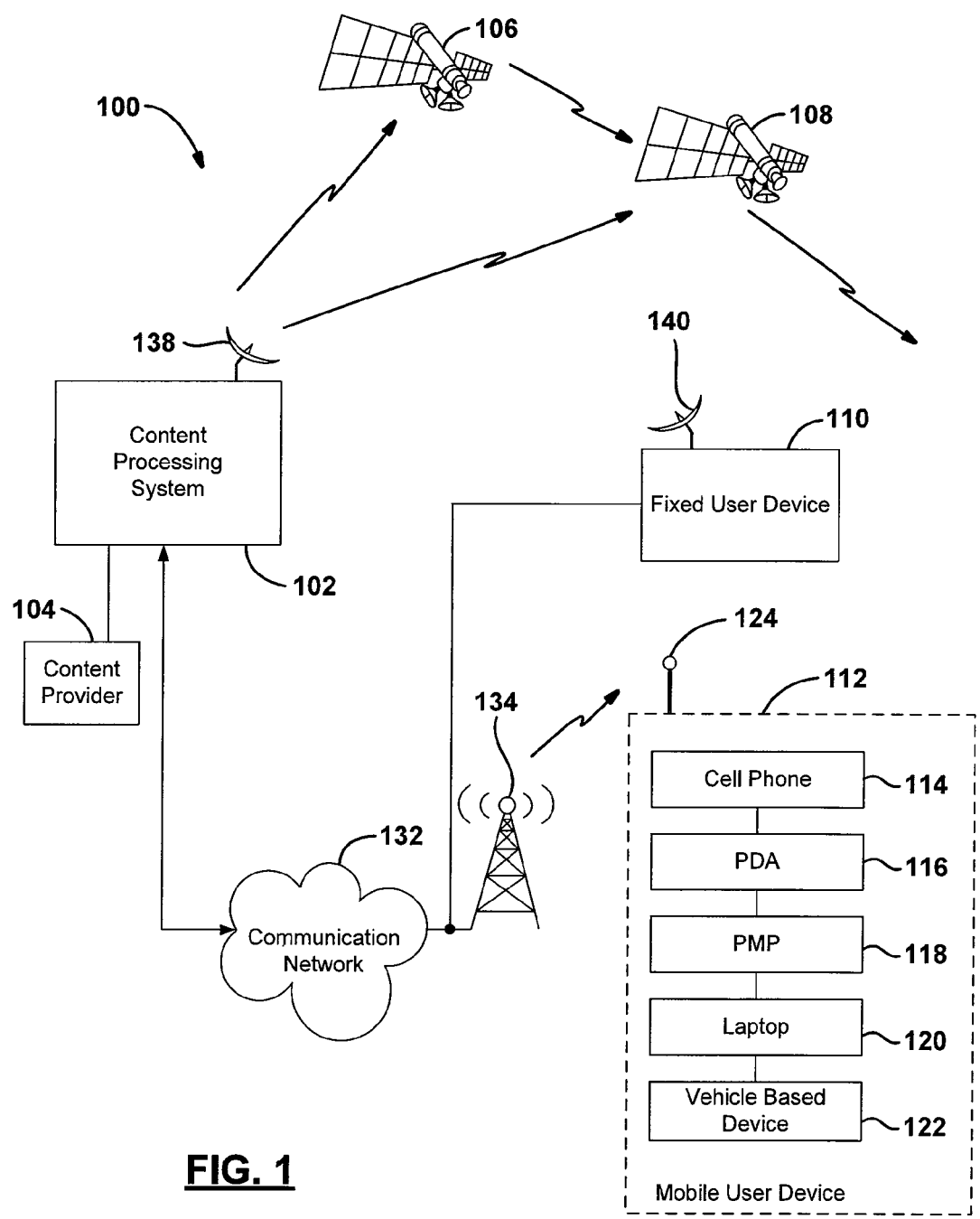
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
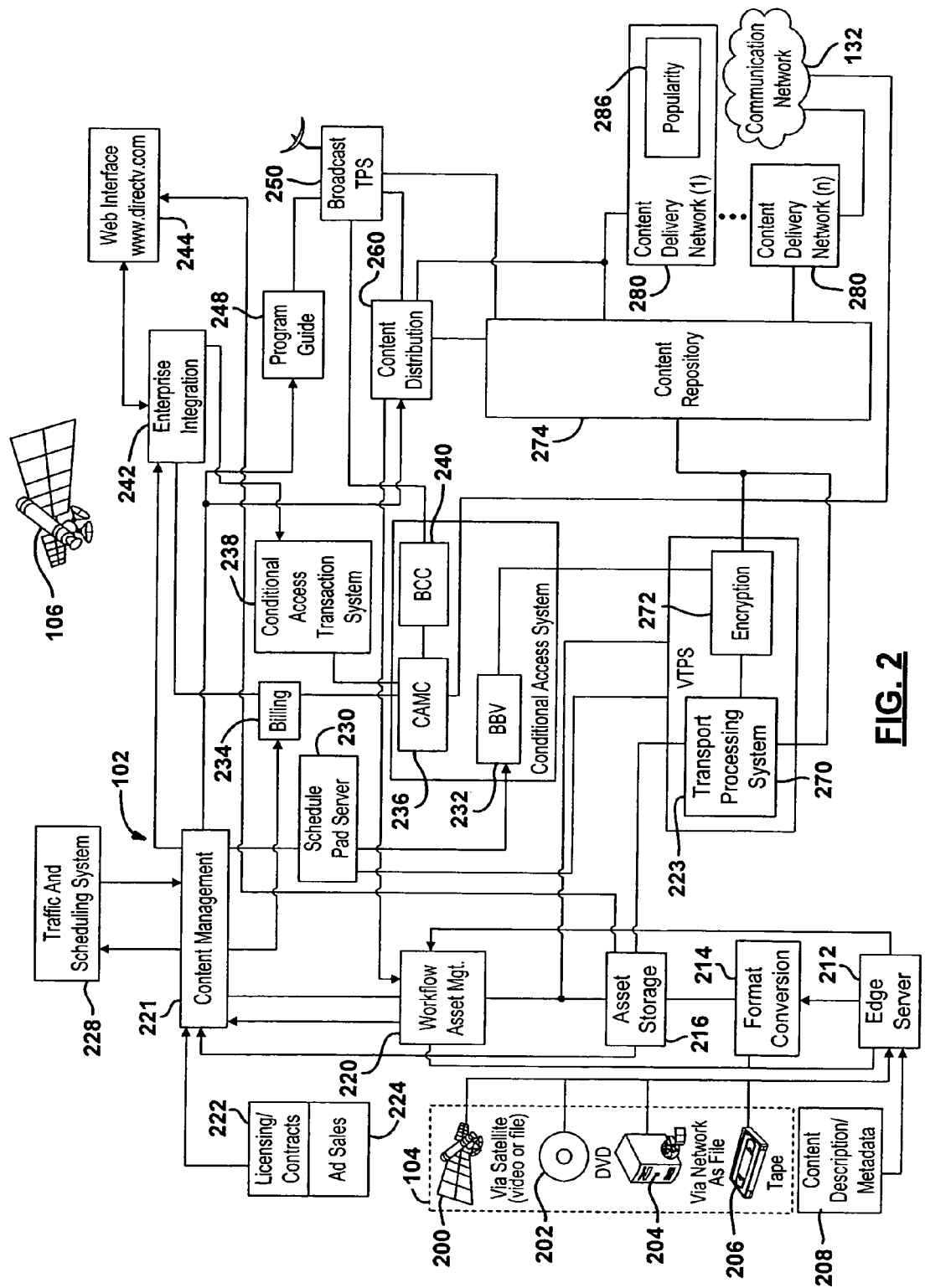
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide a content description and other metadata 208 to the system. An input server 212 may receive the various content and associated metadata and convert the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Content files may also be provided from the content management system 221 to the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD 110 and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

The content delivery network 280 may also be used to count the number of times a particular content has been requested for download. A popularity rating determination module 286 may be included in the content delivery network 280. The popularity determination module 286 ultimately provides a popularity rating to the content management system 221. Of course, the popularity rating determination module 286 may generate a count and the content management system may generate a count of the number of downloads and provide that to the content management system 221. Each content delivery network 280 may provide the popularity rating or count to the content management system 221. The content management system 221 may combine the counts from several control delivery networks 280.

The content management system 221, in response to the information from the popularity rating determination module 286, may be used to assign a satellite category or a broadband category to each of the plurality of content files. The popularity rating may also be used to allocate assets of the satellite to the distribution of content through the satellite 106. The asset allocation of the satellite may depend upon various conditions. The satellite includes a particular bandwidth or "pipe" that is used for uplinking of material or content. Some of the bandwidth of the satellite is typically used for live broadcast. Another portion of the satellite may be used for broadband satellite distribution. The portion of the satellite broadband distribution asset may be referred to as the pipe or the broadband pipe which indicates it is other than the live or real time content. The overall pipe may be divided into several pipes or subpipes and used for various numbers of content. From the list of the content corresponding to popularity ratings, several of the broadband content files may be distributed at any particular time. If one item of the broadband content is very popular, more resources may be allocated to that particular content. The bigger the pipe associated with the content, the less time it takes a user to download the content. However, less bandwidth will be available to other types of content. Therefore, the allocation of the pipe may be based upon several things, including the size of a content file, the popularity rating, the number of pipes and the pipe size. System requirements may cause the pipe size pipe number to vary over time. For example, the schedule of broadband content to be downloaded may be changed periodically. The broadband content schedule may be changed once a day or several times a day.

It is beneficial to provide popular content over the satellite to reduce the burden of the broadband terrestrial-based communication network. Terrestrial-based communication may be more expensive in certain situations. Therefore, popular items may be broadcast through the satellite while less popular content may be broadcast through the communication network 132. Thus, based upon the popularity, the satellite or the communication network 132 may be chosen. Thereafter, the satellite assets may also be allocated based upon the popularity of various content.

Figure 3:
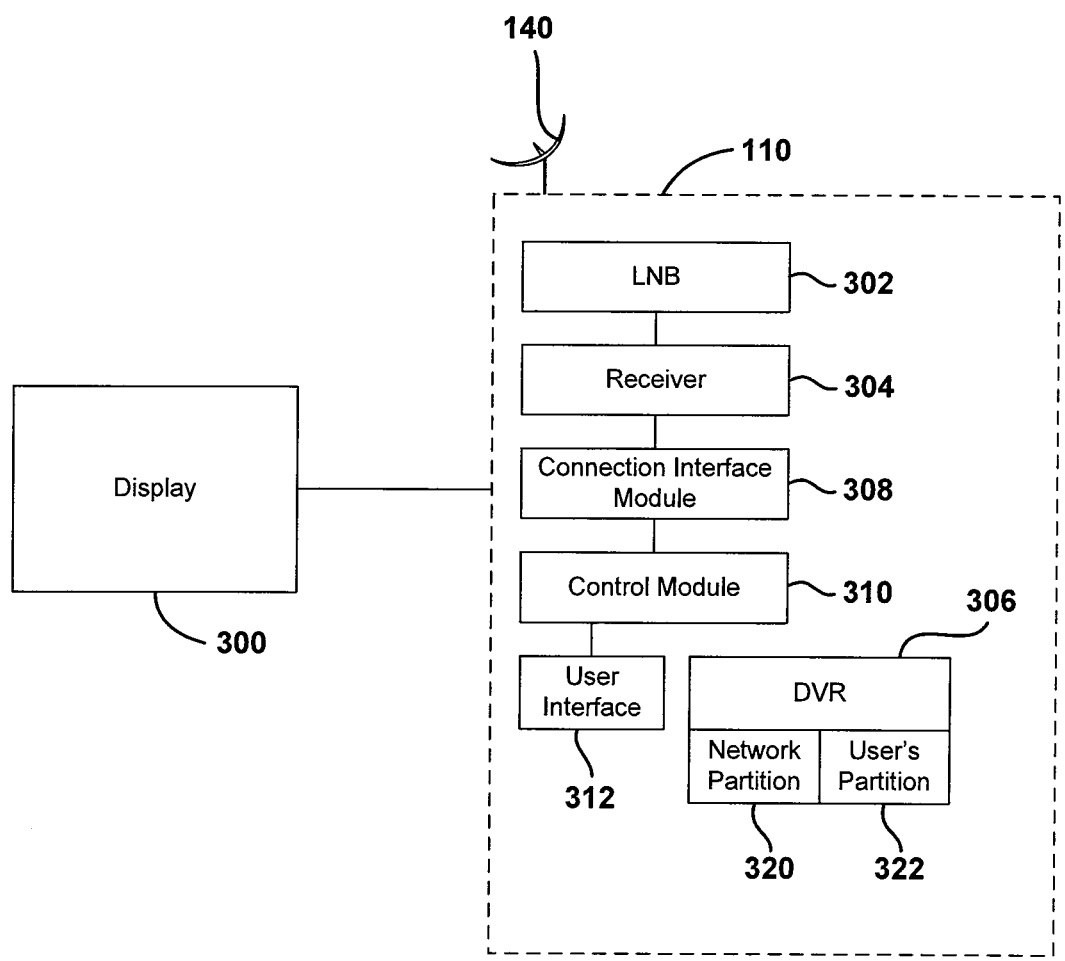
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a recorder 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of storage devices such as a hard disk drive, DVR, or other types of memory devices. The memory device 306 may be used to store the packetized assets and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4A:
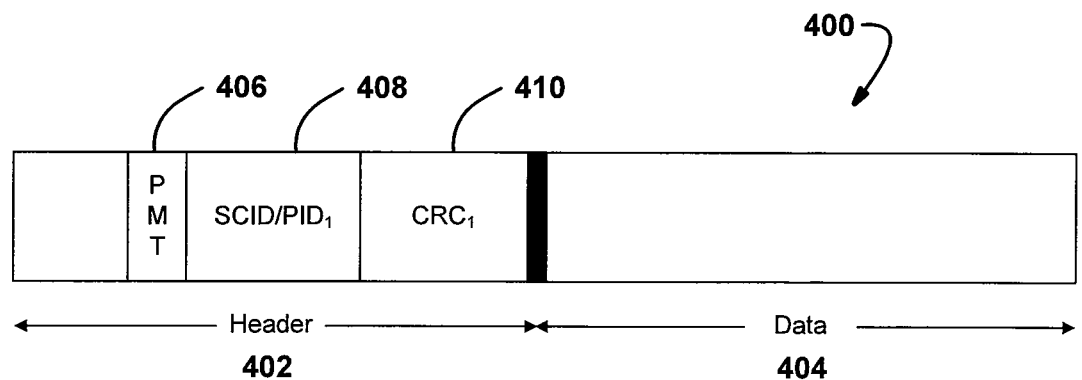
FIGS. 4A and 4B are representational views of packets formed according to the present disclosure.
Figure 4B:
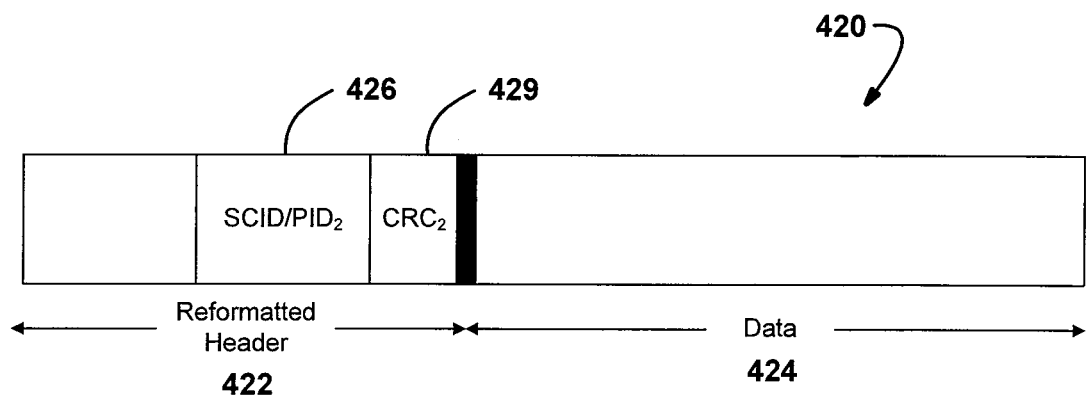

Referring now to FIGS. 4A and 4B, a packet 400 having a header 402 and a data portion 404 is illustrated. The header 402 may include a program map table (PMT) 406, an SCID/PID portion 408, and a cyclic redundancy check portion 410. This is representative of the output of the VTPS and the file stored in the content repository. The data portion 404 may be encrypted or not encrypted, while the header portion 402 is preferably not encrypted. A signal may be broadcast from the content distribution network with this type of format.

In FIG. 4B, a second packet 420 having a reformatted header 422 and a data portion 424 is illustrated. The data portion 424 may be unchanged from data portion 404. The reformatted header 422 includes a second SCID/PID 426 that has been changed. The header 426 of the packet 420 has its identification (SCID/PID) reconfigured so that it may be broadcast by the satellite. Because the SCID/PID is changed, the CRC portion 428 is also changed to conform to this change.

Figure 5:
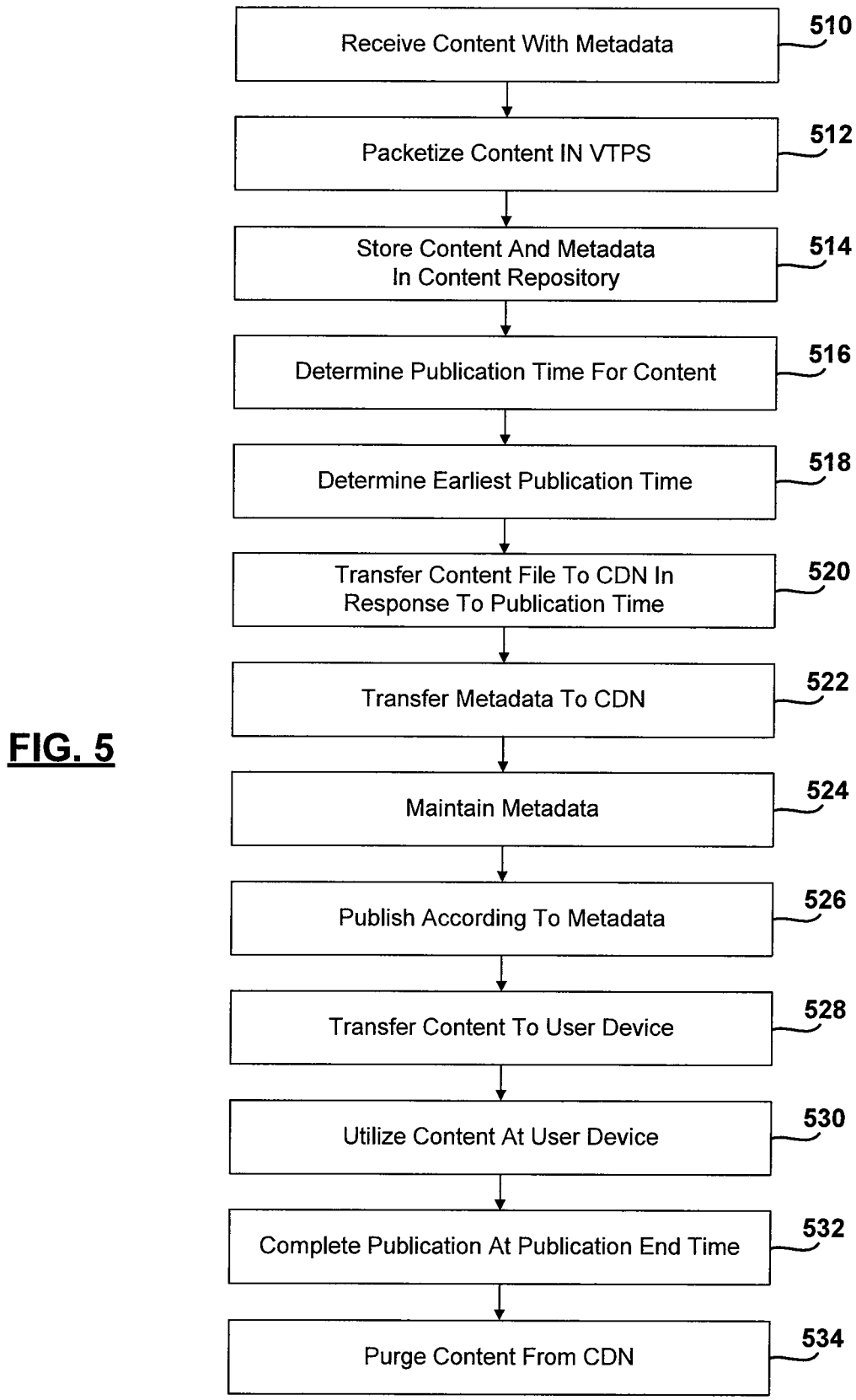
FIG. 5 is a flowchart illustrating a method for publishing and purging content.

Referring now to FIG. 5, a method of operating the communication system is set forth. In this embodiment, the general method for maintaining the files within the system is set forth. In step 510, content with metadata is received in the communication system. As mentioned above, the content provider 104 may provide the content in various forms. In step 512, the content is packetized in the VTPS 223. Also, as mentioned above, the VTPS may also encrypt the packets or at least the data portions of the packets. In step 514, the packets, whether encrypted or not, are stored in the content repository 274. In step 516, a time for publication is determined. The publication time corresponds to the time that the content is available for download by one of the user devices from the content delivery network 280. Various content within the content repository may have different publication times. In step 518, the earliest publication time for the various content is determined. In step 520, the content file is transferred to the content delivery network 280 in response to the publication time. That is, the earliest publication time may be used to transfer content to the content delivery network first. The content may be transferred prior to the publication time so that it is available at the publication time. This is in contrast to a typical satellite broadcasting system and to the broadcast TPS system 250 described in FIG. 2. In a satellite system, the content is broadcast at the air time.

In step 522, metadata corresponding to the content file is transferred to the content delivery network 280. In step 524, the metadata may be changed according to information from the content management system. For example, the publication time, the publication end time, and a purge time may be added to the metadata. In step 526, the content file is published according to the publication time in the metadata. In step 528, the content may be transferred to the user device. In step 530, the user device may utilize the content by viewing the content on the display device. In step 532, publication is complete at the publication end time. In step 534, the content is purged from the content delivery network according to a purge message.

Figure 6:
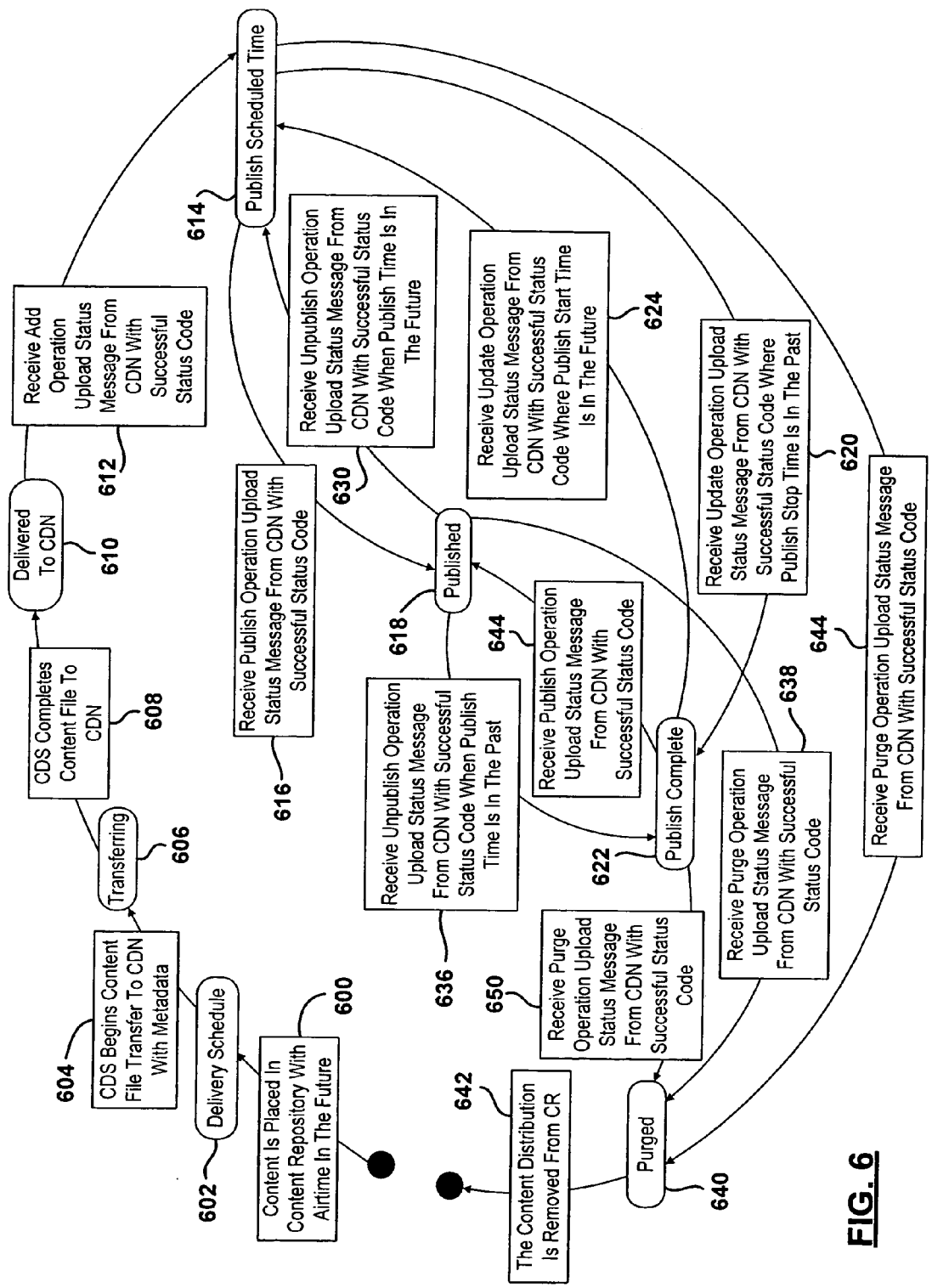
FIG. 6 is a state diagram for publishing and purging content.

Referring now to FIG. 6, a state diagram of the method of FIG. 5 is illustrated. The method begins in step 600 in which the content is placed in the content repository 274 after possible encryption and packetizing from the VTPS 223. In step 602, delivery is scheduled by the content management system 221. The content distribution system 260 begins content file transfer to a content delivery network 280 with metadata in step 604. In step 606, the content with the metadata is transferred. In step 608, the content delivery system completes the content file transfer to the content delivery network 280. In step 610, the content is fully delivered to the content distribution or delivery network 280. In step 612, an add operation is received by the content delivery network. An upload status message from the content delivery network (CDN) with a successful status code is provided.

In step 614, publication is scheduled by setting a publication time. After step 614, step 616 may be performed. In step 616, the content delivery network 280 may receive a publish operation. Also in step 616, an upload status message from the content delivery network may be provided to the content distribution system with a successful status code. In step 618, the content is published.

Referring back to step 614, if an update operation message is received and the upload status message from the content delivery network with a successful status code with the published stop time is in the past at 620, step 622 may be performed. Step 622 ends the publication according to the publication stop time.

Referring back to step 614, if a receive update operation is received and an upload status message from the content delivery network has a successful status code where the publish start time is in the future in step 624, step 622 completes the publication.

Referring back to step 618, when the content is published in 618 and an unpublished operation is received with an upload status message from the content delivery network with a successful status code and a published time in the future, step 630 is performed which brings the system back to the published scheduled block 614.

Referring back to step 618, if an unpublished operation message is received in step 636, and the upload status message from the content delivery network with a successful status code has a publication time in the past, step 622 is performed which completes the publication. In step 618, if a purge operation message is received from the content distribution system and the upload status message from the content distribution network with a successful status code is provided in step 638, the content is purged in step 640.

Referring back to step 622, if the publication is complete and a published operation is received with an upload status message from the content delivery network with a successful status code in step 644, the content is again published in step 618.

Referring back to step 622, if the publication is complete and a purge operation upload status message is received from the content delivery network with a successful status code in step 650, step 640 purges the content from the system. In step 642, the content may be removed from the content repository.

Referring back to the publication schedule times block 614, if a receive purge operation is received that blocks and an upload status message from the content delivery network has a successful status code, step 640 is performed in which the content is purged.

Figure 7:
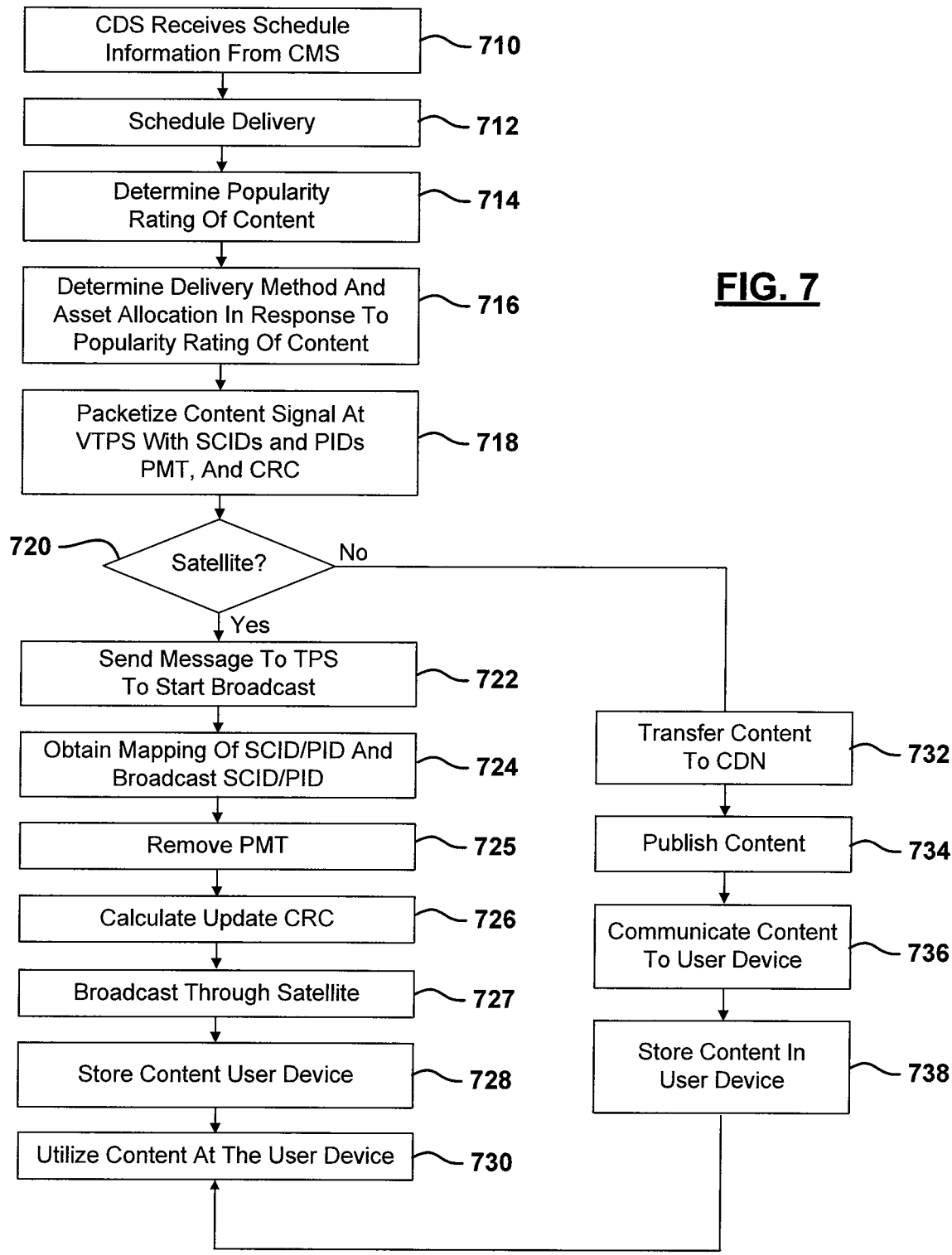
FIG. 7 is a flowchart of a method of transferring content through a satellite or a communication network according to the present disclosure.

Referring now to FIG. 7, the communication system 100 may communicate content through a satellite or through a communication network 132 such as the Internet. The method of FIG. 7 illustrates one way to determine which method may be used. In step 710, the content distribution system 260 receives scheduled information from the content management system 220. In step 712, delivery is scheduled. In step 714, the popularity of a content file may be determined. The popularity of the file may be determined at the content delivery network or, more specifically, in the popularity rating determination module 286. At a minimum, the popularity rating determination module 286 comprises a counter to count the number of times a particular content file has been requested through the communication network 132 of FIG. 2. The content management system 221 may be used to determine the asset allocation of the satellite network.

In step 716, the delivery method and asset allocation based on the popularity of the content is determined. Each of the content files has a particular size which, therefore, translates to a particular amount of data. The satellite bandwidth available for uplinking broadband content may change over time or may be fixed. Dividing up the bandwidth into various numbers of pipes with various sizes may allow the content to be communicated at various speeds. It may be desirable to broadcast popular content at high speeds and less popular content at lower speeds. Further, it may be desirable to provide the most popular content through various numbers of pipes, so that various users may receive the popular content at various times. System designers may allocate the resources based upon the popularity and various manners, depending on the ultimate goal of the system. These system goals may change throughout the life of the system at various intervals, such as throughout a day or a week. Therefore, the asset allocation may determine how big to make the various pipes, how many pipes to use, and the number of titles available for each pipe. It should be noted that various numbers of titles of content or content files may be transmitted through the same pipe.

In step 718, the content is packetized at the video transport processing system with SCIDs or PIDs, PMT and CRC.

In step 720, it is determined whether or not the popularity corresponds to a satellite. If satellite distribution is determined, step 722 sends a message to the transport processing system 250 of FIG. 2 to start a broadcast. In step 724, mapping may be obtained from the content management system. The mapping may be broadcast with the guide data at times other than when the content is transmitted. The content distribution system 260 obtains the mapping and changes the SCIDs or PIDs from the VTPS 223 to broadcast SCIDs or PIDs. In step 725, the program map table (PMT) is removed from the header. In step 726, a new CRC is calculated. In step 727, the content with the broadcast SCID or PIDs and the CRC are broadcast through the satellite. In step 728, content is stored in the user device. In step 730, the contents are utilized at the user device.

Referring back to step 720, if the content does not correspond to a satellite, step 732 is performed. In step 732, the contents are transferred to a content delivery network. In step 734, the contents are published. In step 736, the contents are communicated to the user device through the communication network 132.

In step 738, the content is stored in the user device. After step 738, step 730 is again performed in which the user device utilizes the content.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    storing a content file having a header for terrestrial communication in a content repository associated with a content distribution system;
    receiving a request for content from a user device;
    determining a popularity rating of the content file after receiving the request for content;
    in response to the popularity rating, selecting a satellite for communicating the content;
    allocating satellite assets in response to the popularity rating;
    reformatting the header of the content file from a first header to a second header by removing a program map table and changing a service channel identifier or program identifier to a broadcast service channel identifier or broadcast program identifier suitable for satellite broadcasting in response to selecting the satellite; and
    broadcasting a mapping to the user device;
    tuning the user device in response to the mapping;
    receiving the content file with the second header at the user device from the satellite instead of a terrestrial communication network in response to tuning.

2. A method as recited in claim 1 wherein allocating satellite assets comprises allocating satellite assets at a content management system.

3. A method as recited in claim 1 wherein allocating satellite assets comprises allocating a number of pipes and pipe sizes.

4. A method as recited in claim 1 wherein allocating satellite assets comprises determining a number of content titles for pipes and distributing the content corresponding to the titles through pipes.

5. A method as recited in claim 1 wherein allocating satellite assets comprises allocating satellite assets in response to a content size.

6. A method as recited in claim 1 wherein allocating satellite assets comprises allocating satellite assets at a content delivery network.

7. A method as recited in claim 6 wherein determining a popularity rating comprises determining the popularity rating based on an amount of downloads from the content delivery network.

8. A method as recited in claim 1 wherein determining a popularity rating comprises determining the popularity rating at a content delivery network and further comprising communicating the popularity rating to a content management system.

9. A method comprising:
    storing a plurality of content files having headers for terrestrial communication in a content repository associated with a content distribution system, said headers each comprising a program map table and a service channel identifier or a program identifier;
    receiving a request for a selected content of the plurality of content files from a user device;
    determining a popularity rating of the plurality of content files after receiving the request for a first content;
    assigning a satellite category or a broadband category to each of the plurality of content files in response to the popularity rating;
    in response to the satellite category, reformatting a header of a first content file of the plurality of content files from a first header to a second header by removing the program map table and changing the service channel identifier or program identifier to a broadcast service channel identifier or broadcast program identifier suitable for satellite broadcasting, communicating the first content file with the second header to a transport processing system, communicating the content with the second header to a satellite from the transport processing system, broadcasting a mapping to the user device, tuning the user device based on the mapping and receiving the content at the user device through the satellite in response to tuning; and in response to the broadband category, communicating the content to a content delivery network, communicating the content to a terrestrial communication network from the content delivery network and communicating content to the user device through the terrestrial communication network.

10. A method as recited in claim 9 further comprising determining a popularity rating at a content delivery network.

11. A method as recited in claim 10 wherein the popularity rating corresponds to an amount of downloads from the content delivery network.

12. A method as recited in claim 9 further comprising determining a popularity rating at a content delivery network and communicating the popularity rating to a content management system.

13. A method as recited in claim 9 further comprising in response to the satellite category, determining a satellite asset allocation and wherein communicating content to the user device comprises communicating the content to the user device in response to the asset allocation.

14. A method as recited in claim 13 wherein determining an asset allocation comprises determining the asset allocation at a content management system.

15. A method as recited in claim 13 wherein determining the satellite asset allocation comprises determining a number of pipes and a pipe sizes.

16. A method as recited in claim 13 wherein determining the satellite asset allocation comprises determining a number of content titles and distributing the content corresponding to the titles through pipes.

17. A method as recited in claim 13 further comprising determining a satellite asset location in response to a content size.

18. A communication system comprising:
- a content repository storing a plurality of content files having headers for terrestrial communication associated with a content distribution system;
- a transport processing system communicating with the content distribution system;
- a terrestrial communication network;
- a content delivery network communicating with the content distribution system and the terrestrial network and determining a popularity rating of the content;
- a content management system receiving the popularity rating and assigning a satellite category or a broadband category to each of the plurality of content files in response to the popularity rating;
- said content distribution system reformatting a first header of a first content with a plurality of content files to a second header by removing a program map table and changing a service channel identifier or program identifier to a broadcast service channel identifier or broadcast program identifier suitable for satellite broadcasting, communicating the first content to the transport processing system in response to the satellite category;
- said content management system generating a mapping in response to the content management system assigning a satellite category;
- a guide delivery system broadcasting the mapping to a user device;
- said transport processing system broadcasting the content with the second header through a satellite from the transport processing system to the user device;
- said user device receiving the mapping and tuning to the first content from the satellite in response to the mapping;
- said content distribution system in response to the broadband category, communicating the first content with the first header to the content delivery network; and
- said content delivery network communicating the first content with the first header through a terrestrial communication network to the user device.

19. A communication system as recited in claim 18 wherein the content delivery network determines the popularity rating corresponding to an amount of downloads from the content delivery network.

20. A communication system as recited in claim 18 wherein the content delivery network communicates the popularity rating to a content management system.

21. A communication system as recited in claim 18 wherein the content management system determines a satellite asset allocation in response to the popularity rating and wherein the content delivery network communicates the first content to the user device in response to the asset allocation.

22. A communication system as recited in claim 21 wherein the content management system determines the satellite asset allocation by determining a number of pipes and a pipe sizes for the first content.

23. A communication system as recited in claim 21 wherein the content management system determines the satellite asset allocation by determining a number of content titles and distributing the content corresponding to the titles through pipes.

24. A communication system as recited in claim 21 wherein the content management system determines the satellite asset allocation by determining an asset location in response to a content size.

* * * * *